US008935767B2

(12) United States Patent
Li et al.

(10) Patent No.: US 8,935,767 B2
(45) Date of Patent: Jan. 13, 2015

(54) OVERLAY HUMAN INTERACTIVE PROOF SYSTEM AND TECHNIQUES

(75) Inventors: Weisheng Li, Bothell, WA (US); Bin Zhu, Edina, MN (US); Ning Xu, Beijing (CN); Jia Liu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 249 days.

(21) Appl. No.: 12/780,013

(22) Filed: May 14, 2010

(65) Prior Publication Data

US 2011/0283346 A1 Nov. 17, 2011

(51) Int. Cl.
*H04L 29/00* (2006.01)
*G06F 9/44* (2006.01)
*G06F 21/36* (2013.01)
*H04L 9/32* (2006.01)

(52) U.S. Cl.
CPC ........ *G06F 9/44* (2013.01); *G06F 21/36* (2013.01); *H04L 9/32* (2013.01)
USPC ............................................................ 726/7

(58) Field of Classification Search
CPC .............. G06F 9/44; G06F 21/36; H04L 9/32
USPC ..................... 713/168; 707/710; 709/903
See application file for complete search history.

(56) References Cited

U.S. PATENT DOCUMENTS

2007/0300307 A1 12/2007 Duncan
2008/0063279 A1 3/2008 Vincent et al.
2008/0127302 A1 5/2008 Qvarfordt et al.
2008/0133676 A1 6/2008 Choisser et al.
2009/0313694 A1 12/2009 Mates
(Continued)

FOREIGN PATENT DOCUMENTS

WO 2009/022242 A1 2/2009
WO 2009150655 A1 12/2009

OTHER PUBLICATIONS

Rusu, Amalia., "Exploiting the Gap in Human and Machine Abilities in Handwriting Recognition for Web Security Applications.", Retrieved at << http://www.cedar.buffalo.edu/~govind/amalia_thesis.pdf >>, Aug. 2007, pp. 141.

(Continued)

*Primary Examiner* — Jeffrey Pwu
*Assistant Examiner* — Michael D Anderson
(74) *Attorney, Agent, or Firm* — Bryan Webster; Kate Drakos; Micky Minhas

(57) ABSTRACT

The overlay human interactive proof system ("OHIPS") and techniques described herein operate in conjunction with any known or later developed computer-based applications or services to provide secure access to resources by reliably differentiating between human and non-human users. Humans have a generally superior ability to differentiate misaligned characters or objects from correctly aligned ones. As such, the OHIP splits an image including one or more visual objects into two or more partial images to form a HIP. The partial images may also be further split into groups of sub-partial images, and/or the partial images (or the sub-partial images) may be moved, so that at any given alignment position, a user can recognize only some visual objects. A user is instructed to reassemble the partial images at one or more predetermined alignment positions using a GUI, and the user is asked to identify information regarding one or more visible objects.

20 Claims, 7 Drawing Sheets

(56) References Cited

U.S. PATENT DOCUMENTS

2010/0077210 A1* 3/2010 Broder et al. ............... 713/168
2011/0208716 A1* 8/2011 Liu et al. ...................... 707/710

OTHER PUBLICATIONS

Ince, et al., "Designing Captcha Algorithm: Splitting and Rotating the Images against OCRs", Retrieved at << http://ieeexplore.ieee.org/stamp/stamp.jsp?tp=&arnumber=4682308&isnumber=4682195 >>, ICCIT, Proceedings of the 2008, Third International Conference on Convergence and Hybrid Information Technology, vol. 2, Nov. 11-13, 2008, pp. 596-601.

Kluever, Kurt A., "Breaking the PayPal HIP: A Comparison of Classifiers", Retrieved at << http://www.kloover.com/publications/Kluever_-_Breaking_the_PayPal_HIP.pdf >>, May 20, 2008, pp. 1-17.

Ferzli, et al., "A Captcha Based on the Human Visual Systems Masking Characteristics", Retrieved at << http://ieeexplore.ieee.org/stamp/stamp.jsp?tp=&arnumber=4036650&isnumber=4036510 >>, IEEE International Conference on Multimedia and Expo, Jul. 9-12, 2006, pp. 517-520.

Rusu, et al., "A Human Interactive Proof Algorithm Using Handwriting Recognition", Retrieved at << http://www.google.co.in/search?hl=en&q=%22human+interactive+proof%22+and+splitting+images&meta=&aq=f&oq=>>, ICDAR Proceedings of the Eighth International Conference on Document Analysis and Recognition, Aug. 31-Sep. 1, 2005, pp. 5.

Fischer, et al., "Visual CAPTCHAs for Document Authentication", Retrieved at << http://ieeexplore.ieee.org/stamp/stamp.jsp?tp=&arnumber=4064603&isnumber=4064505 >>, 8th IEEE International Workshop on Multimedia Signal Processing (MMSP 2006), Oct. 3-6, 2006, pp. 471-474.

Rusu, et al., "The Influence of Image Complexity on Handwriting Recognition", Retrieved at << http://hal.archives-ouvertes.fr/docs/00/11/26/66/PDF/cr107970902218.pdf >>, Tenth International Workshop on Frontiers in Handwriting Recognition (2006), pp. 5.

Ahn, et al., "Telling Humans and Computers Apart Automatically", Retrieved at << http://www.cs.cmu.edu/~biglou/captcha.pdf >>, Communications of the ACM, vol. 47, No. 2, Feb. 2004, pp. 1-11.

Ahn, et al., "CAPTCHA: Using Hard AI Problems for Security", Retrieved at << http://www.cs.cmu.edu/~biglou/captcha_crypt.pdf >>, In Proceedings of Eurocrypt, 2003, pp. 8.

Baird, et al., "Human Interactive Proofs and Document Image Analysis", Retrieved at << http://www2.parc.com/istl/projects/captcha/docs/hipdia.ps >>, Lecture Notes in Computer Science, vol. 2423, Proceedings of the 5th International Workshop on Document Analysis Systems V, Aug. 19-21, 2002, pp. 1-12.

Chellapilla, et al., "Designing Human Friendly Human Interaction Proofs (HIPs)", Retrieved at << http://research.microsoft.com/en-us/um/people/kumarc/pubs/chellapilla_chi05.pdf >>, Conference on Human Factors in Computing Systems, Proceedings of the SIGCHI conference on Human factors in computing systems, Apr. 2-7, 2005, pp. 10.

Chew, et al., "Image Recognition CAPTCHAs", Retrieved at << http://www.cs.berkeley.edu/~tygar/papers/Image_Recognition_CAPTCHAs/imagecaptcha.pdf >>, In Proceedings of the 7th International Information Security Conference (ISC 2004), Sep. 27-29, 2004, pp. 12.

Rui, et al., "Artifacial: Automated Reverse Turing Test using FACIAL Features", Retrieved at << http://nms.lcs.mit.edu/~kandula/projects/killbots/killbots_files/facial.pdf >>, International Multimedia Conference, Proceedings of the eleventh ACM international conference on Multimedia, Nov. 2-8, 2003, pp. 12.

Datta, et al., "Imagination: A Robust Image-Based CAPTCHA Generation System", Retrieved at << http://infolab.stanford.edu/~wangz/project/imsearch/IMAGINATION/ACM05/datta.pdf >>, International Multimedia Conference, Proceedings of the 13th annual ACM international conference on Multimedia, Nov. 6-11, 2005, pp. 4.

Elson, et al., "Asirra: A CAPTCHA that Exploits Interest-Aligned Manual Image Categorization", Retrieved at << http://research.microsoft.com/pubs/74609/CCS2007.pdf >>, Proceedings of 14th ACM Conference on Computer and Communications Security (CCS), Oct. 2007, pp. 9.

Author Unknown, "YUNiTi", Retrieved at << http://www.yuniti.com/register.php >>, Retrieved date: Aug. 12, 2009, pp. 1.

Gossweiler, et al., "What's Up CAPTCAH? A CAPTCHA Based on Image Orientation", Retrieved at << http://www.richgossweiler.com/projects/rotcaptcha/rotcaptcha.pdf >>, International World Wide Web Conference, Proceedings of the 18th international conference on World wide web, Apr. 20-24, 2009, pp. 10.

"International Search Report", Mailed Date: Jan. 18, 2012, Application No. PCT/US2011/035794, Filed Date: May 9, 2011, pp. 8.

Extended European Search Report mailed Nov. 21, 2013, issued in connection with corresponding European Patent Application No. 11781096.0 (7 pages total).

Datta, et al., "Exploiting the Human-Machine Gap in Image Recognition for Designing CAPTCHAs," IEEE Transactions on Information Forensics and Security, vol. 4(3), Sep. 1, 2009, pp. 504-518 (15 pages total).

* cited by examiner

OVERLAY HUMAN INTERACTIVE PROOF SYSTEM AND TECHNIQUES

BACKGROUND

Many computer-based applications and/or services have a need to distinguish between human and computer users (often referred to as "bots") that access computer-accessible resources. For example, there are many online email services that allow a user to create email accounts by entering certain basic information. The user is then able to use the email accounts to send and receive emails. This ease of establishing email accounts has allowed spammers to use bots (e.g., computer programs) that automatically create email accounts with randomly generated account information, and employ the email accounts to send out thousands of spam emails. Other exemplary computer-based applications or services provide users with convenient ways to order goods or services, and are vulnerable to security and/or privacy breaches resulting from bots posing as human users.

User tests (sometimes known as Completely Automated Public Turing tests to tell Computers and Humans Apart ("CAPTCHA"), and also generically referred to as human interactive proofs ("HIPs")) may be employed to distinguish between humans and bots. When a HIP is employed, a user is allowed to access certain resources only after passing a test based on the HIP that indicates that the user is human. Generally, HIPs are designed in a manner that bots have difficulty passing the tests, but humans find it easier to pass the tests.

Bots have become better at circumventing known text- and image-based HIPs through improved character recognition and image filtering and processing techniques. In some cases, a bot will pass HIP tests at a rate that may not be acceptable to computer-based services or applications or their users. There is a continuing need to develop HIPs that are useful to reliably differentiate human and non-human users.

SUMMARY

An overlay human interactive proof system ("OHIPS") and techniques usable for differentiating human from non-human users (referred to herein as "bots") are discussed herein. The OHIPS receives a user's request for access to a resource accessible via any known or later developed computer-based application or service, generates a HIP, evaluates a user response to the HIP, and grants or denies access to the resource based on the user response.

In an exemplary implementation, a HIP is generated by identifying one or more visible objects, such as images of text, numbers, or general content, and arranging the visible object(s) in accordance with a predetermined placement scheme within defined regions of a space to form a solution image. The solution image is split (by applying a mask, for example) into two or more partial images to form the HIP. The partial images are able to be aligned at one or more predetermined alignment positions. Extra information may be added to certain partial images. The partial images may also be further split into groups of sub-partial images. The partial images and/or the sub-partial images may be moved by translating, convolutional shifting, rotating, overlaying, or any other known or later developed movement technique. When multiple alignment positions are provided, at any given alignment position, a user may only be able to recognize some visual objects, while other visual objects may remain incorrectly aligned and difficult to recognize.

By using a graphical user interface ("GUI") to reassemble at least some of the partial images at one or more of the predetermined alignment positions, a user is able to visualize at least a portion of the solution image, and identify one or more visual objects in a manner that enables the OHIPS to determine whether the user is likely human or a bot. The motion of partial images against one another in the GUI may be restricted. If the partial images were formed in a manner that at any given alignment position only some visual objects are recognizable, the user may be instructed to align the partial images at multiple correct alignment positions to solve the HIP (for example, recognize all of the visible objects in the HIP).

In this manner, the superior ability of humans, compared to bots, to differentiate misaligned characters or objects from correctly aligned ones is utilized to reliably differentiate human and non-human users. The OHIPS and the techniques discussed herein enable computer-based services or applications that rely on HIPs to grant access to resources to achieve greater security and reliability.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this document.

DETAILED DESCRIPTION

The overlay human interactive proof system ("OHIPS") and techniques described herein operate in conjunction with any known or later developed computer-based applications or services to provide secure access to resources by reliably differentiating between human and non-human users. Exemplary operation of the OHIPS is described with reference to HIPs that include visible objects in the form of images of text characters, although it will be appreciated that there are virtually unlimited types of known and later developed visible objects (including but not limited to images of numbers and/or general content) with which the system and techniques described herein may be implemented or used.

Figure 1:
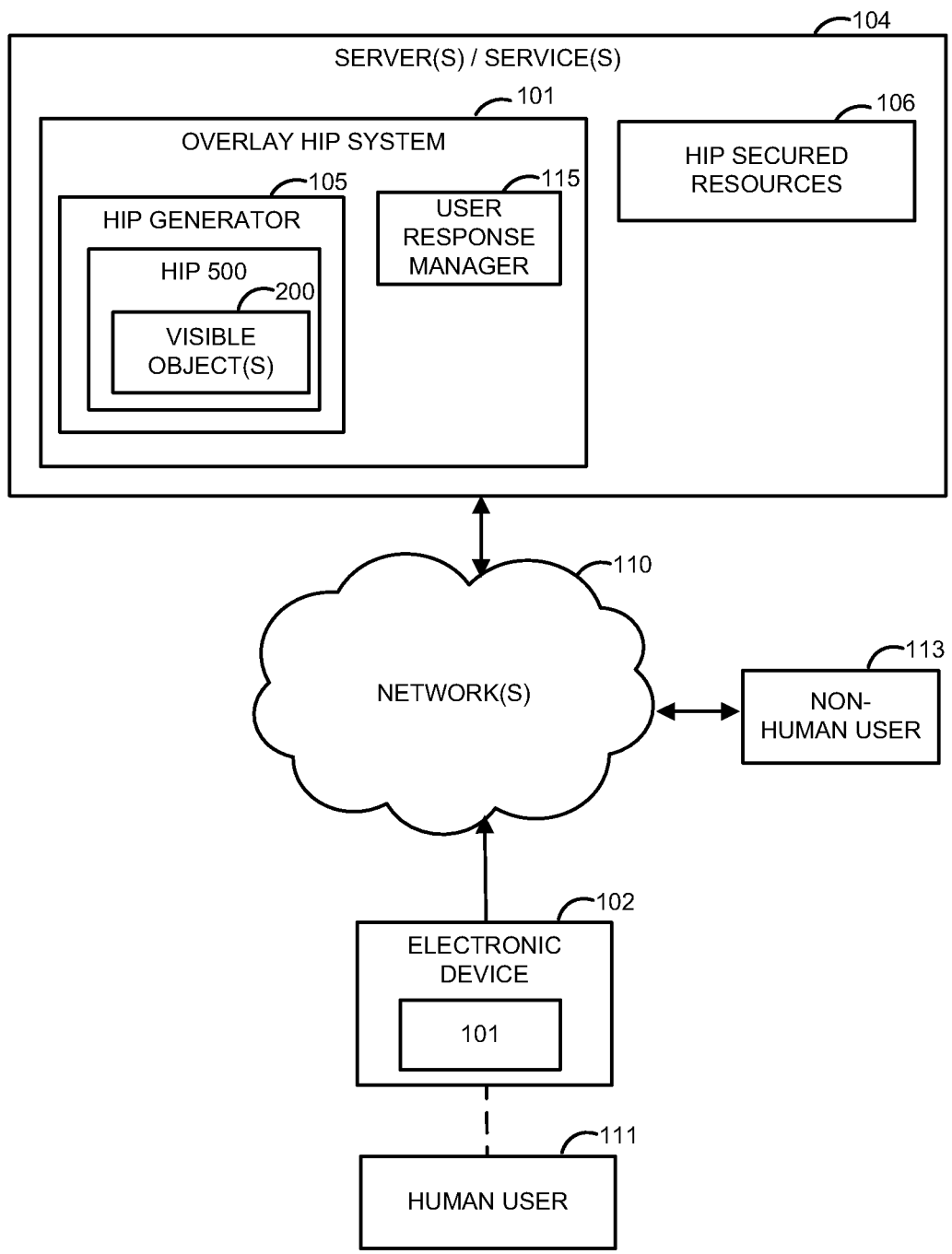
FIG. 1 is a simplified functional block diagram illustrating an exemplary communication architecture within which aspects of an overlay human interactive proof system ("OHIPS") may be implemented or used.

Turning now to the drawings, where like numerals designate like components, FIG. 1 is a simplified functional block diagram illustrating an exemplary communication architecture within which aspects of OHIPS 101 may be implemented or used to manage access to HIP-secured resources 106. As shown, HIP-secured resources 106 are implemented as or within server(s)/service(s) 104 and accessed via network(s) 110 (which represent any existing or future, public or private, wired or wireless, wide-area or local-area, packet-switched or circuit-switched communication infrastructures or technologies). It will be appreciated, however, that any known or later developed client-side or network-side resources may be secured by OHIPS 101. Likewise, aspects of OHIPS 101 may be network-based and/or client-based, and different functions of OHIPS 101 may be performed by different devices or programs, and/or at different locations or networks.

A HIP generator 105 is responsible for generating HIP 500 in response to a request from a human user 111 (shown operating an electronic device 102) or a non-human user 113 (also referred to herein as a "bot") for access to one or more HIP-secured resources 106.

HIP 500 is composed of one or more visible objects 200 (discussed further below, in connection with FIG. 2), which are split into two or more partial images (HIP 500 and generation thereof is discussed further below, in connection with FIGS. 5 through 8).

A user response manager 115 is responsible for evaluating information input by the requesting user regarding HIP 500, and granting or denying access to the HIP-secured resource(s).

In an exemplary operating scenario, HIP 500 is displayed to a user, along with instructions for the user to input information regarding the visible object(s) 200. Based on the user-input information, it can be determined whether it is likely that the user is human user 111 or bot 113. In generally, when the user accurately identifies certain information regarding the visible object(s), it is assumed that the user is human. When user inaccurately identifies the information, it is assumed that the user is a bot.

Figure 2:
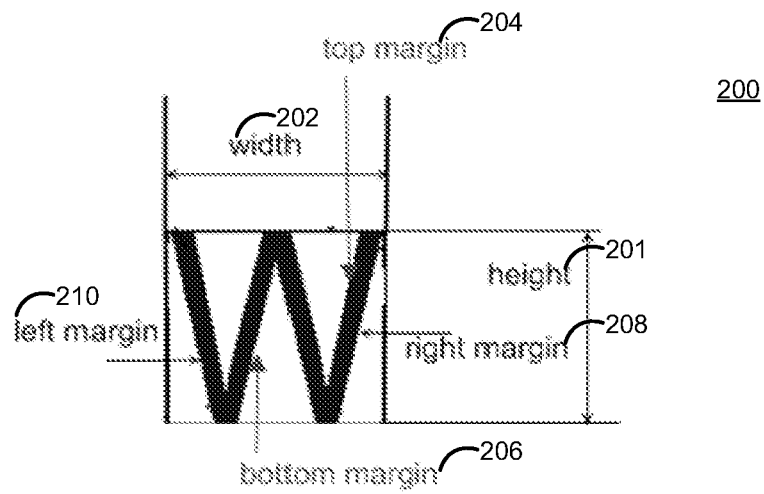
FIG. 2 is a pictorial diagram of an exemplary visible object usable by the OHIPS shown in FIG. 1 to form a human interactive proof ("HIP") to facilitate user access to resources secured by the OHIPS.

With continuing reference to FIG. 1, FIG. 2 is a pictorial diagram of an exemplary visible object 200 usable to form HIP 500. As shown, visible object 200 is the character "W," which is a character found in the alphabets of several human languages. Humans have been trained at recognizing characters of alphabets since childhood, so the task of entering information regarding such characters is easily understood by users with minimal instructions. In addition, each character generally has a corresponding key on an input device such as a keyboard, which facilitates convenient entry of requested information (for example, identification and/or enumeration of characters) regarding HIP 500 from a wide variety of devices. It will be appreciated, however, that there are virtually unlimited types of known and later developed visible objects (including but not limited to images of numbers and/or general content) which the system and techniques described herein may be implemented or used, and that there are numerous ways to ask a user to input information, and different types of requested information, depending on the nature of the visible object(s) 200.

Turning again to FIG. 2, visible object 200 has associated therewith certain parameters, including but not limited to a width 202, a height 201, a left margin 210, a right margin 208, a top margin 204, and a bottom margin 206. It may be desirable to modify one or more of the parameters, to prevent bots from using optical character recognition to easily recognize character-type visible objects. For example, margins may be reduced such that different characters touch each other, character dimensions may be altered such that the character appears distorted or warped, and/or different fonts or styles may be used. Humans generally have a better ability to correctly identify warped, crowded, or otherwise distorted characters than do bots.

Humans likewise have a better ability than bots to identify misaligned characters or objects from correctly aligned ones. Accordingly, exemplary HIP 500 and generation techniques described below with reference to FIGS. 3-9 are exceptionally useful to reliably differentiate human and non-human users, enabling computer-based services or applications that rely on HIP 500 to grant access to HIP-secured resources 106 in a secure and reliable manner.

Figure 3:
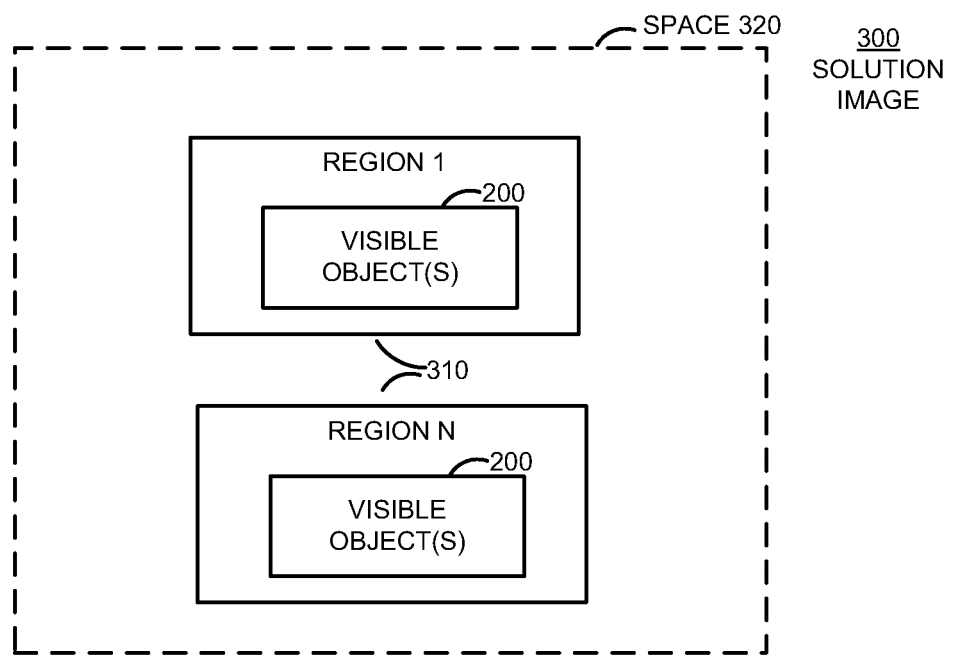
FIG. 3 is a simplified functional block diagram of a solution image usable by the OHIPS shown in FIG. 1 to form a HIP.

With continuing reference to FIGS. 1 and 2, FIG. 3 is a simplified functional block diagram of a solution image 300, from which HIP 500 is formed. Solution image 300 includes two or more regions 310 (region 1 and region N are shown). One or more visible objects 200 are identified, such as images of text, numbers, or general content, and the visible object(s) are arranged in accordance with a predetermined placement scheme within defined regions 301 of a space 320 having any desired size or geometry to form solution image 300. Visible objects 200 may touch each other and/or be warped or otherwise distorted (for example, drawn with different fonts, styles, rotations, or warping) as described in connection with FIG. 2.

In an exemplary implementation, two regions 310 are formed within space 320. The size and geometry of space 320, as well as the number and size of visible objects 200, may determine the size and geometry of regions 310. Generally, regions 310 are center-symmetric based on the center of space 320, and there is suitable margin between them. Positions of regions 310 may be random.

Figure 4:
FIG. 4 is a pictorial diagram of an exemplary solution image, the simplified block diagram of which is shown in FIG. 3.
Figure 5:
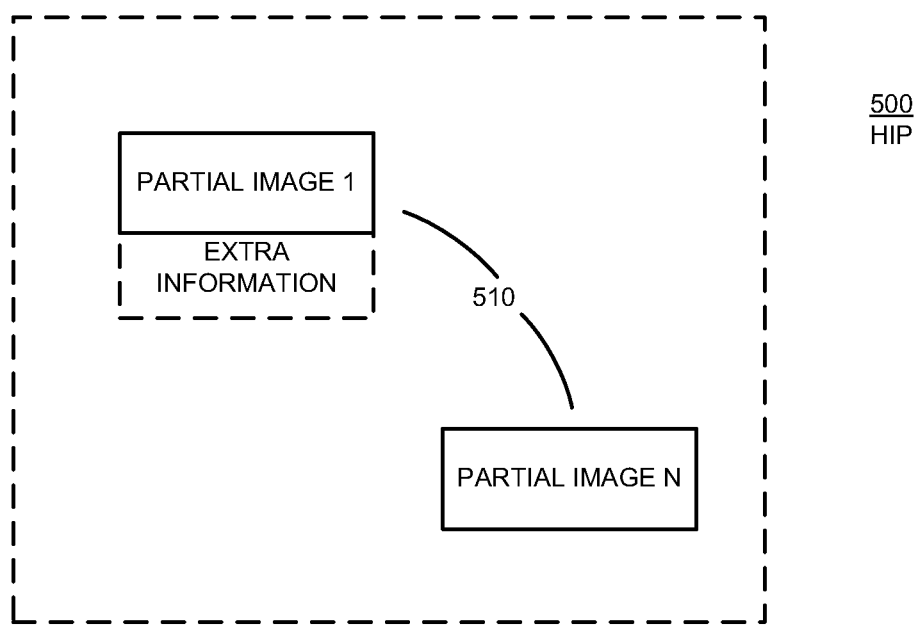
FIG. 5 is a simplified functional block diagram of a HIP formed by the OHIPS shown in FIG. 1.

In one exemplary placement scheme, visual objects 200 are placed in the regions from top-to-bottom, left-to-right. In this exemplary placement scheme, given the size of one region, and the number and size of visible objects, the average number of lines ("NL") and number of characters ("NC") in each line is determined. A buffer (referred to as "StkBD") may be used to store the stroke boundary information of characters previously placed. Initially, StkBD is empty. The current line number ("Row"), and the current visible object number in the line ("Col") are also set to zero initially. At random, one visible object (Vi) is selected. If Col>=NC, Row<=Row+1, Col<=0, then place Vi with its previous sibling Vi−1 along the horizontal direction. If Row>0, then try to move Vi along the vertical direction to touch the visible object(s) above (meanwhile the horizontal position may also be adjusted to keep horizontal touch). StkBD is updated when Vi is properly placed. Then next visible object 200 is fetched, and the process is repeated until each visible object has been placed. FIG. 4 is a pictorial diagram of an exemplary solution image 300, which was formed using this exemplary placement scheme.

In another exemplary placement scheme, visual objects 200 may be placed into space 320 having one region 310 in a ring formation. Given the size of space 320, and the number and size of the visible objects, the radius of the ring and the position angle theta in the ring of each visible object is determined. When calculating the angle theta, it may be desirable to add a random factor. The visible objects may be placed in order of ascending theta. Buffer StkBD, which is empty initially, stores stroke boundary information regarding visible objects previously placed. If touching objects are desired, if Vi is not touching a previously placed object, Vi may be rotated or scaled. StkBD is updated as visible objects are properly placed, and the process is repeated until each visible object has been placed.

With continuing reference to FIGS. 1-4, FIG. 5 is a simplified functional block diagram of HIP 500, which is formed from exemplary solution image 300 depicted in FIG. 4. HIP 500 is formed by splitting solution image 300 into two or more partial images 510 (partial image 1 and partial image N are shown). Extra information, which generally does not prevent humans from correctly recognizing the underlying image content when partial images correctly aligned, but which has a purpose of confusing bots to make it harder to correctly reassemble/align partial images, may be added to one or more partial images. For example, the extra information may be occluded by the information from the solution image contained in the partial image on top of the partial image that contains the extra information. HIP 500 may also include any computer-executable instructions or references thereto, which are desirable to enable an end user to move one image against another to ascertain the predetermined alignment position(s) that result in at least a portion of the original solution image (and one or more visible object(s) therein) being recognizable.

Figure 6:
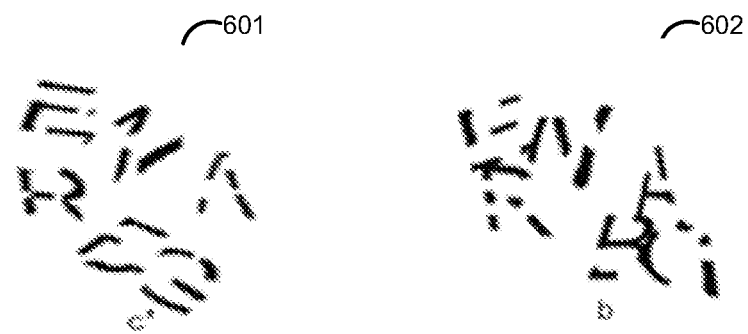
FIG. 6 is a pictorial diagram of two exemplary partial images formed from the exemplary solution image shown in FIG. 4.
Figure 7:
FIG. 7 is a pictorial diagram of an exemplary mask usable by the OHIPS shown in FIG. 1 to form a HIP.

FIG. 6 is a pictorial diagram of two exemplary partial images comprising HIP 500—image c' 601 and image b 602—formed from the exemplary solution image shown in FIG. 4.

In some cases, it may be desirable for partial images of HIP 500 to include some broken strokes of one or more visual objects. Images c' 601 and b 602 illustrate such broken strokes. Each partial image includes some broken strokes of the characters in solution image 300 shown in FIG. 4. A broken stroke in one partial image may overlap another broken stroke in another partial image. In an exemplary implementation, a mask, such as mask 700 depicted in FIG. 7, may be generated to form the broken strokes of the visual objects in a particular solution image. The strokes of visual objects in the black region of mask 700 would be removed and those in the white regions would remain within the partial images. The gray region is the overlapping region, in which the strokes would remain. Mask 700 generally ensures that the broken strokes are evenly distributed over the entire solution image 300. Attacks by bots can be mitigated by not splitting a stroke into too many pieces.

Figures 8, 9:
FIG. 8 is a pictorial diagram illustrating the formation of several exemplary partial images formed from the exemplary solution image shown in FIG. 4
FIG. 9 is a pictorial diagram illustrating the exemplary partial images shown in FIG. 8 in two different alignment positions.

When generating the final images for HIP 500, it may also be desirable to further split partial images into groups of sub-partial images. Partitioning techniques may be used in this regard. FIG. 8 illustrates the steps involved in forming images c' 601 and b 602 from solution image 300. For example, as indicated, partial image 802 is partitioned into two images 804 and 806, where image 804 includes the broken strokes of characters "ENBG" and image 806 includes the broken strokes of characters "R" and "A." Generally, partitioned images may include the upper half of one region 310 of the solution image and the bottom half of another region 310 of the solution image, or vice-versa, depending on the location of the partitioned image.

Next, image 804 is rotated, and combined with image 806, to form image c' 601 illustrated in FIG. 6. The rotation is generally of an arbitrary angle, while avoiding overlapping the characters in the two images during combination. In this manner, at some alignment (rotation) positions, some of the visible objects within solution image 300 may be correctly aligned and thus recognizable, while at other rotation positions, none of the visible objects can be recognized. Reducing the number of recognizable visible objects at each correctly aligned rotation angle can help thwart attacks by bots. In general, touching and warping of the visible objects in the original solution image are not only important in preventing bots from using modern OCR technologies to identify the visible objects, but touching and warping are also important to prevent bots from identifying correctly aligned rotation angles and distinguishing correctly aligned visible objects from misaligned ones. It is also possible to overlay partial images together (along the center, for example), and/or translate them, to add difficulty.

FIG. 9 illustrates two specific alignment positions 902 and 904 at which the images c' 601 and b 602 of HIP 500 illustrated in FIG. 6 may be rotated in such a manner that some of the characters within solution image 300 depicted in FIG. 4 can be recognized by humans. As shown, "ENBG" can be recognized at alignment position 902, and "RA" can be recognized at alignment position 904.

It will be appreciated that a different number of correctly aligned rotation angles may also be generated. For example, if image 802 shown in FIG. 8 is partitioned into N images, with N−1 images being rotated arbitrarily at different angles, and then combined (but not overlapped after combination) to form image c' 601, there would be N correctly aligned rotation angles when image c' 601 is rotated against image b 602. If image 802 is not partitioned, then there would be only one correctly aligned rotation angle, i.e., at a specific rotation angle, all the visible objects can be recognized.

Certain Internet-based applications may not efficiently support rotation operations by end users who are using Web browser GUIs. As an alternative, or in addition, to the rotation scheme described above, convolutional image shifting may also be employed, in which a moving image is assumed to be spatially periodic. The spatial period is appropriately chosen to avoid spatial aliasing. Generally, it is larger than the minimum spatial region that encloses all the visible objects in the solution image. The period is the same for all of the moving images if there is more than one moving image in the HIP. Shifting may be performed horizontally, vertically, or at any angle. At specific shift positions, certain visible objects can be recognized, while others cannot.

With continuing reference to FIGS. 1-9, FIG. 10 is a flowchart of an exemplary method of generating and using a human interactive proof, such as HIP 500, to determine whether a user is likely human or non-human in response to a user request for access to an HIP-secured resource, such as one or more HIP-secured resources 106.

Figure 10:
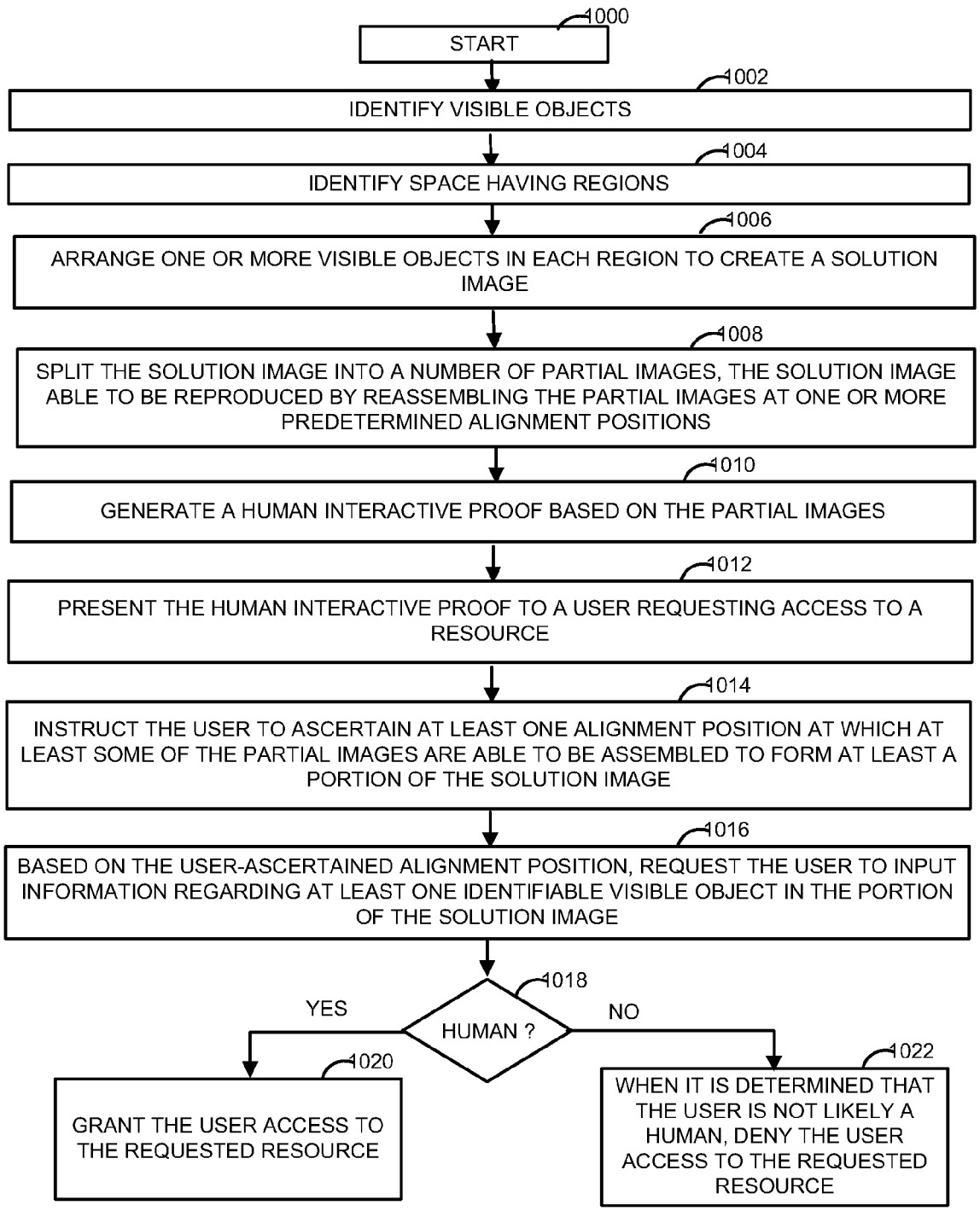
FIG. 10 is a flowchart of an exemplary method of using the OHIS shown in FIG. 1 to generate and use a HIP to determine whether a user is likely human or non-human in response to a user request for access to an HIP-secured resource.

The method illustrated in FIG. 10 may be implemented by computer-executable instructions (such as computer-executable instructions 1106, shown and discussed in connection with FIG. 11) that are stored in a computer-readable medium (computer-readable media 1104 are also shown and discussed in connection with FIG. 11) and executed by one or more general, multi-purpose, or single-purpose processors (such as processor 1102, also shown and discussed in connection with FIG. 11). Unless specifically stated, the methods or steps thereof are not constrained to a particular order or sequence. In addition, some of the methods or steps thereof can occur or be performed concurrently.

The method begins at block 1000, and continues at block 1002, where one or more visible objects, such as visible object(s) 200, are identified. At block 1004, a space having a number of regions, such as space 320 having regions 310, is identified. Next, one or more visible objects are arranged in each of the plurality of regions to form a solution image, such as solution image 300, as indicated at block 1006. At block 1008, the solution image is split (by applying a mask, for example) into a number of partial images, such as partial images 510. Each of the partial images includes one or more visible objects arranged in one or more regions. Information may be added to certain partial images. The partial images may also be further split into groups of sub-partial images. The partial images and/or the sub-partial images may be moved by translating, convolutional shifting, rotating, overlaying, or any other known or later developed movement technique. It is possible to reproduce at least a portion of the solution image from at least some of the partial images, by reassembling at least some of the partial images at one or more predetermined alignment positions. When multiple alignment positions are provided, at any given alignment position, a user may only be able to recognize some visual objects, while other visual objects may remain incorrectly aligned and difficult to recognize.

A human interactive proof, such as HIP 500, is generated based on the partial images, as indicated at block 1010. At block 1012, the human interactive proof is presented to a user requesting access to an HIP-secured resource. The user is instructed, as indicated at block 1014, to ascertain at least one alignment position at which at least some of the partial images are able to be assembled to form at least a portion of the solution image. For example, the user may be provided with a graphical user interface via which the user can move (e.g., rotate, translate, shift, etc. using a mouse, keyboard, or other input interface) one partial image relative to another. It may be desirable to restrict the motion of partial images against one another. In one exemplary scenario, partial images are arranged to share a point, and images can be rotated around the point. Such motion restriction makes it easier for humans to ascertain the correct alignment position(s).

Based on the user-ascertained alignment position(s), the user is asked to input information regarding at least one identifiable visible object in the portion of the solution image, as indicated at block 1016. That is, the user is requested to "solve" the HIP. To correctly solve the HIP, the user generally needs to correctly align one or more partial images at predetermined alignment positions. When multiple alignment positions are provided, the user may be asked to align the partial images at each of the multiple correct alignment positions. Exemplary information requested includes but is not limited to identification of visible objects by name or number. It will be appreciated, however, that the most appropriate information for which to ask a user depends on the nature of the visible object(s) used to generate the HIP, and the specific application the HIP is applied to.

At diamond 1018, it is determined whether it is likely that the user is a human user, such as user 111, or whether it is likely that the user is a non-human user (e.g., a bot), such as non-human user 113. As indicated at block 1020, if it is determined that the user is likely a human, the user is granted access to the requested resource(s). If it is determined that the user is likely non-human, the user is denied access to the requested resource(s), as indicated at block 1022.

With continuing reference to FIGS. 1-10, FIG. 11 is a simplified functional block diagram of an exemplary operating environment 1100, with which aspects of OHIPS 101 may be implemented or used. Operating environment 1100 is indicative of a wide variety of general-purpose, special-purpose, client- or server-based, stand-alone or networked computing environments. Operating environment 1100 may be, for example, a type of computer, such as a personal computer, a workstation, a server, a consumer electronic device, or any other type of stand-alone or networked computing device or component thereof now known or later developed. Operating environment 1100 may also be a distributed computing network or Internet-based service, for example.

Figure 11:
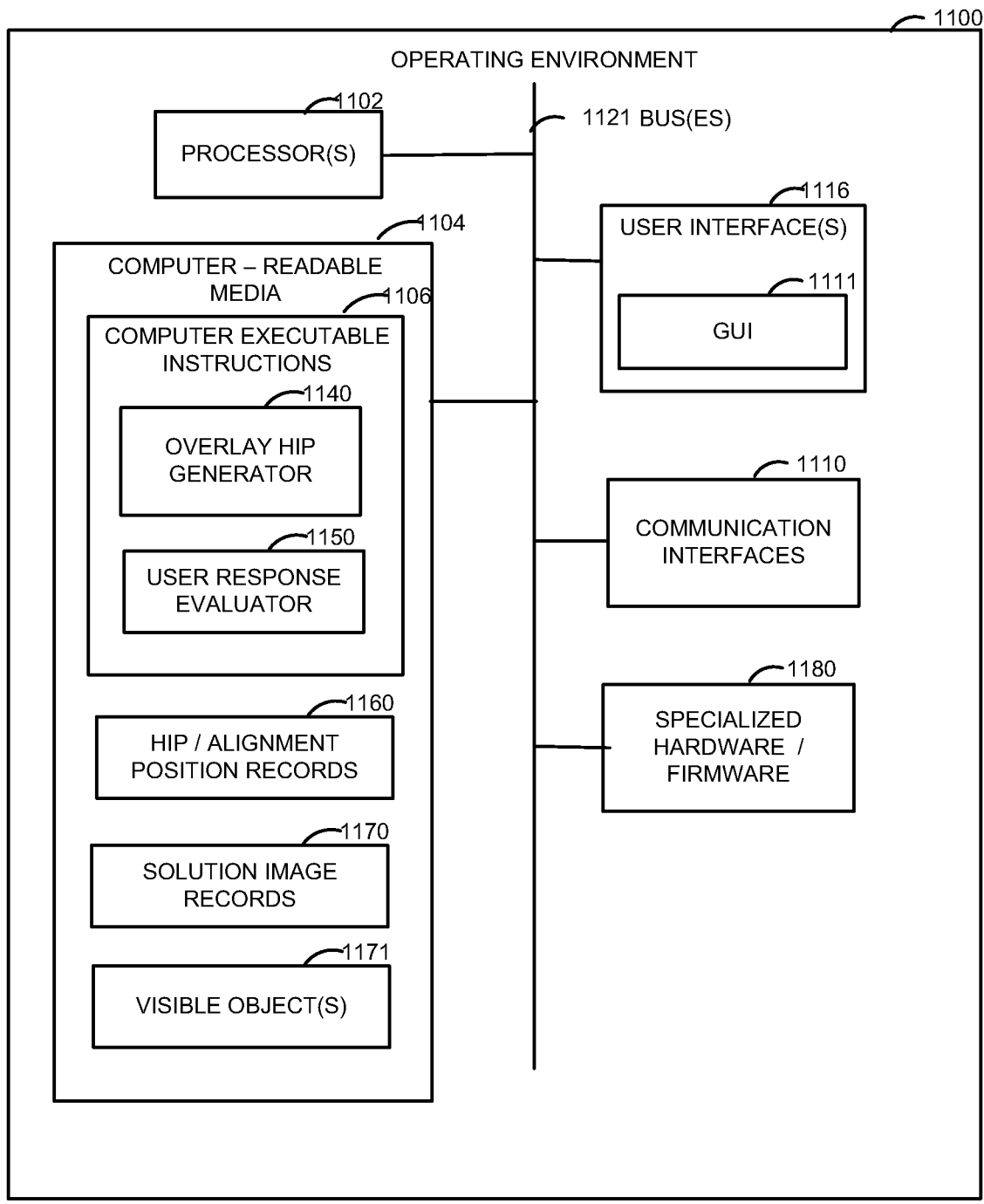
FIG. 11 is a simplified functional block diagram of an exemplary operating environment in which aspects of the OHIPS shown in FIG. 1 and/or the method(s) shown in FIG. 10 may be implemented or used.

One or more components shown in FIG. 11 may be packaged together or separately to implement functions of operating environment 1100 (in whole or in part) in a variety of ways. As shown, bus(es) 1121 carries data, addresses, control signals and other information within, to, or from computing environment 1100 or components thereof.

Communication interface(s) 1110 are one or more physical or logical elements that enhance the ability of operating environment 1100 to receive information from, or transmit information to, another operating environment (not shown) via a communication medium. Examples of communication media include but are not limited to: wireless or wired signals; computer-readable storage media; computer-executable instructions; communication hardware or firmware; and communication protocols or techniques.

Specialized hardware/firmware 1180 represents any hardware or firmware that implements functions of operating environment 1100. Examples of specialized hardware/firmware 1180 include image processing devices, application-specific integrated circuits, secure clocks, and the like.

Processor(s) 1102, which may be one or more real or virtual processors, control functions of operating environment 1100 by executing computer-executable instructions 1106 (discussed further below).

Computer-readable media 1104 represent any number and combination of local or remote components, in any form, now known or later developed, capable of recording, storing, or transmitting computer-readable data, such as instructions 1106 (discussed further below) executable by processor 1102. As shown, HIP/alignment positions records 1160, solution image records 1170, and visible object(s) 1171 are stored in one or more computer-readable media 1104, along with computer executable instructions 1106.

In particular, computer-readable media 1104 may be, or may include persistent memory or main memory, and may be in the form of: a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; or any combination thereof. Computer-readable media 1104 may also include transmission media and data associated therewith. Examples of transmission media/data include, but are not limited to, data embodied in any form of wireline or wireless transmission, such as packetized or non-packetized data carried by a modulated carrier signal.

Computer-executable instructions 1106 represent any signal processing methods or stored instructions that electronically control predetermined operations on data. In general, computer-executable instructions 1106 are implemented as software programs according to well-known practices for component-based software development, and encoded in computer-readable media (such as one or more types of computer-readable storage media 1104). Software programs may be combined or distributed in various ways. Overlay HIP generator 1140 and user response evaluator 1150 are shown.

User interface(s) 1116 represent a combination of presentation tools and controls that define the way a user, such as a community member, interacts with operating environment 1100. One type of user interface 1116 is a graphical user interface ("GUI") 1111, although any known or later developed type of user interface is possible. Presentation tools are used to receive input from, or provide output to, a user. An example of a physical presentation tool is a display such as a monitor device. An example of a logical presentation tool is a data organization technique (for example, a window, a menu, or a layout thereof). Controls facilitate the receipt of input from a user. An example of a physical control is an input device such as a remote control, a display, a mouse, a pen, a stylus, a trackball, a keyboard, a microphone, or a scanning device. An example of a logical control is a data organization technique (for example, a window, a menu, or a layout thereof) via which a user may issue commands. It will be appreciated that the same physical device or logical construct may function as an interface for both inputs to, and outputs from, a user.

Various aspects of an operating environment and an architecture/techniques that are used to implement aspects of OHIPS 101 have been described. It will be understood, however, that all of the described elements need not be used, nor must the elements, when used, be present concurrently. Elements described as being computer programs are not limited to implementation by any specific embodiments of computer programs, and rather are processes that convey or transform data, and may generally be implemented by, or executed in, hardware, software, firmware, or any combination thereof.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. A method for generating a human interactive proof, comprising:
   generating a solution image for the human interactive proof, the solution image including a plurality of objects that are visible in a recognizable form when displayed on a graphical user interface (GUI);
   splitting the solution image into a plurality of partial images; and
   presenting the partial images on the GUI, the partial images being arrangable using input into the GUI into a plurality of different alignments, at least one alignment of the partial images showing a portion of the solution image in the recognizable form, and at least another alignment of the partial images showing no portions of the solution image in the recognizable form.

2. The method according to claim 1, wherein the visible objects are selected from the group comprising text objects, numeric objects, and general images.

3. The method according to claim 1, wherein the visible objects are identifiable by name or quantity or both.

4. The computer readable storage device method according to claim 1, further including arranging the one or more visible objects into each of a plurality of regions in a space, the arranging comprising modifying at least one of the one or more visible objects in a manner selected from the group comprising: modifying a font; modifying a style; modifying a rotation angle; and warping.

5. The method according to claim 4, wherein the regions are center-symmetric relative to the space.

6. The method according to claim 4, wherein a position of a particular region within the space is random.

7. The method according to claim 4, wherein arranging the one or more visible objects in each of the plurality of regions comprises arranging the one or more visible objects in accordance with a placement scheme, the placement scheme selected from the group comprising: a top-to-bottom placement scheme; a left-to-right placement scheme; and a ring placement scheme.

8. The method according to claim 1, wherein splitting the solution image into a plurality of partial images further comprises
   generating a mask for splitting the solution image, and
   applying the mask to the solution image to split the solution image into the plurality of partial images.

9. The method according to claim 1, wherein the method further comprises
   adding extra information to at least one partial image.

10. The method according to claim 9, wherein the extra information is at least in part occluded by at least one other partial image when the solution image is intact.

11. The method according to claim 1, wherein the method further comprises
   splitting at least one of the plurality of partial images into a group of sub-partial images.

12. The method according to claim 1, wherein the method further comprises
   moving at least one of the plurality of partial images relative to at least one other of the partial images.

13. The method according to claim 12, wherein the moving is selected from the group comprising: translating; convolutional shifting; rotating; and overlaying.

14. A computer-readable storage device encoded with computer-executable instructions which, when executed by a processor, perform a method comprising:
   receiving a request for access to a resource;
   presenting on a graphical user interface (GUI), a human interactive proof comprising a plurality of partial images, the partial images capable of being moved into a solution image having recognizable visible objects, the partial images being presented in an initial alignment with respect to each other so that no visible objects in the solution image are recognizable;

providing instructions on the GUI for moving the partial images into a user-selected alignment so that at least one visible object in the solution image is recognizable;

requesting that information be input into the GUI regarding the at least one recognizable visible object in the solution image; and based on the input information, determining whether a user is a human user or a non-human user;

when it is determined that the user is a human user, granting the access to the requested resource; and when it is determined that the user is a non-human user, denying access to the requested resource.

15. The computer-readable storage device according to claim 14, wherein the resource comprises a computer-accessible resource.

16. The computer-readable storage device according to claim 14, wherein the input information regarding the at least one recognizable visible object comprises a name of the at least one visible object or a quantity of the at least one visible object or both.

17. The computer-readable storage device according to claim 14, wherein instructing the user comprises configuring the GUI to enable the user to move at least one of the plurality of partial images relative to at least one other of the plurality of partial images; and instructing the user to produce a transformed image by moving the at least one of the plurality of partial images into the user-selected alignment wherein the input information is based on the transformed image.

18. The computer-readable storage device of claim 14 further including providing instructions on the GUI for moving the partial images into a second user-selected alignment so that at least another visible object in the solution image is recognizable, and requesting that information be input into the GUI regarding the other recognizable visible object in the solution image.

19. A method for accessing a resource on a network, comprising:

requesting access to the resource;

in response to the request, receiving a human interactive proof comprising a plurality of partial images that are displayed on a graphical user interface (GUI), the partial images capable of being moved into a solution image having recognizable visible objects, the partial images being presented in an initial alignment with respect to each other so that no visible objects in the solution image are recognizable;

using the GUI to move the partial images into a first user-selected alignment so that at least one visible object in the solution image is recognizable;

using the GUI to move the partial images into a second user-selected alignment so that at least one other visible object in the solution image is recognizable, the moving of the partial images into the first and second user-selected alignments being selected from one of translating, convolutional shifting, rotating, or overlaying;

providing information about the recognizable visible objects in the solution image, the information identifying the recognizable visible objects in the solution image by name or quantity; and receiving access to the requested resources in response to the provided information.

20. The method of claim 19 further including restricting the movement of the partial images to reduce a number of possible alignments for the partial images so as to facilitate movement of the partial images into the first and second user-selected alignments.

\* \* \* \* \*